(12) United States Patent
Lei (10) Patent No.: US 12,219,515 B2
(45) Date of Patent: Feb. 4, 2025

(54) DATA TRANSMISSION METHOD AND APPARATUS, COMPUTER READABLE MEDIUM, AND ELECTRONIC DEVICE

(71) Applicant: TENCENT TECHNOLOGY (SHENZHEN) COMPANY LIMITED, Shenzhen (CN)

(72) Inventor: Yixue Lei, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 261 days.

(21) Appl. No.: 17/982,939

(22) Filed: Nov. 8, 2022

(65) Prior Publication Data

US 2023/0060066 A1 Feb. 23, 2023

Related U.S. Application Data

(63) Continuation of application No. PCT/CN2021/127451, filed on Oct. 29, 2021.

(30) Foreign Application Priority Data

Jan. 4, 2021 (CN) .......................... 202110003820.6

(51) Int. Cl.
*H04W 56/00* (2009.01)
(52) U.S. Cl.
CPC .............. *H04W 56/0055* (2013.01)
(58) Field of Classification Search
CPC ..... H04L 5/006; H04L 1/0018; H04L 1/0011; H04L 5/0046; H04L 1/203; H04L 1/0025;
(Continued)

(56) References Cited

U.S. PATENT DOCUMENTS 9,300,431 B2 * 3/2016 Hosangadi ............ H04L 5/0094
2014/0177448 A1 * 6/2014 Wu ........................ H04W 28/18
370/329
(Continued)

FOREIGN PATENT DOCUMENTS

CN 102958108 A 3/2013
CN 108631946 A 10/2018
(Continued)

OTHER PUBLICATIONS

The World Intellectual Property Organization (WIPO) International Search Report for PCT/CN2021/127451 Dec. 27, 2021 6 Pages (including translation).
The State Intellectual Property Office of the People's Republic of China (SIPO) Office Action 1 for 202110003820.6 Feb. 8, 2024 8 Pages (including translation).

*Primary Examiner* — Jung Liu
(74) *Attorney, Agent, or Firm* — ANOVALAW GROUP PLLC (57) ABSTRACT

A data transmission method includes: acquiring a time delay parameter corresponding to an advanced interactive data packet, and acquiring time delay monitoring information between the next generation nodeB and a user equipment; acquiring a transmission delay of the advanced interactive data packet on a network side in response to identifying that a data packet transmitted by a user plane function belongs to data sub-packets obtained by splitting the advanced interactive data packet; predicting, according to the time delay parameter, the time delay monitoring information, and the transmission delay of the advanced interactive data packet on the network side, whether transmitting the data sub-packets to the user equipment meets a time delay desirable; and stopping, in response to determining that transmitting the data sub-packets to the user equipment does not meet the time delay desirable, transmitting the data sub-packets (Continued)

obtained by splitting the advanced interactive data packet to the user equipment.

20 Claims, 7 Drawing Sheets

(58) Field of Classification Search
CPC ............... H04L 1/0005; H04L 5/0094; H04L 47/283; H04L 43/0858; H04L 41/5009; H04L 43/0852; H04B 17/364; H04W 28/0268; H04W 72/23; H04W 24/02; H04W 24/08; H04W 28/24; H04W 72/543; H04W 24/10
See application file for complete search history.

(56) References Cited

U.S. PATENT DOCUMENTS

| | | | |
|---|---|---|---|
| 2019/0320467 A1* | 10/2019 | Freda | H04W 74/004 |
| 2021/0274389 A1 | 9/2021 | Wang | |
| 2022/0052956 A1* | 2/2022 | Hu | H04B 17/364 |

FOREIGN PATENT DOCUMENTS

| | | |
|---|---|---|
| CN | 108848532 A | 11/2018 |
| CN | 110062426 A | 7/2019 |
| CN | 111866929 A | 10/2020 |
| CN | 112804707 A | 5/2021 |

* cited by examiner

DATA TRANSMISSION METHOD AND APPARATUS, COMPUTER READABLE MEDIUM, AND ELECTRONIC DEVICE

RELATED APPLICATION(S)

This application is a continuation application of PCT Patent Application PCT/CN2021/127451 filed on Oct. 29, 2021, which claims priority to Chinese Patent Application No. 202110003820.6, entitled "DATA TRANSMISSION METHOD AND APPARATUS, COMPUTER READABLE MEDIUM, AND ELECTRONIC DEVICE" and filed with the China National Intellectual Property Administration on Jan. 4, 2021, all of which are incorporated herein by reference in its entirety.

FIELD OF THE TECHNOLOGY

The present disclosure relates to the field of computer and communication technologies, and in particular, to a data transmission method and apparatus, a computer readable medium, and an electronic device.

BACKGROUND

In 5th-Generation (5G) and evolved 5G systems, high-bandwidth advanced interactive businesses are an important business type, such as cloud gaming, Virtual Reality (VR), Augmented Reality (AR), Mixed Reality (MR), Extended Reality (XR), and Cinematic Reality (CR). These advanced interactive businesses have a desirable for transmission time. In addition, with the improvement of resolutions, frame rates, degrees of freedom and other indicators, the amount of data generated by an application layer increases greatly. As a result, network transmission is loaded. A data packet content generated by an application layer may be cut into a number of data packet segments for transmission at a low latency. The data packet content cannot be restored and presented in real time at a receiving end once the transmission of one of the segments does not meet a transmission desirable. Certain desirables of the high-bandwidth advanced interactive businesses cannot be met. How to reduce occupancy of transmission resources as much as possible during transmission of a data packet of advanced interactive businesses is a technical problem.

SUMMARY

Embodiments of the present disclosure provide a data transmission method and apparatus, a computer readable medium, and an electronic device.

Other features and advantages of the present disclosure become obvious through the following detailed descriptions, or may be partially learned partially through the practice of the present disclosure.

In one aspect, the present disclosure provides a data transmission method, which is applied to a next generation nodeB. The method includes: acquiring a time delay parameter corresponding to an advanced interactive data packet, and acquiring time delay monitoring information between the next generation nodeB and a user equipment; acquiring a transmission delay of the advanced interactive data packet on a network side in response to identifying that a data packet transmitted by a user plane function belongs to data sub-packets obtained by splitting the advanced interactive data packet; predicting, according to the time delay parameter, the time delay monitoring information, and the transmission delay of the advanced interactive data packet on the network side, whether transmitting the data sub-packets to the user equipment meets a time delay desirable; and stopping, in response to determining that transmitting the data sub-packets to the user equipment does not meet the time delay desirable, transmitting the data sub-packets obtained by splitting the advanced interactive data packet to the user equipment.

In another aspect, the present disclosure provides a data transmission apparatus, which is applied to a next generation nodeB. The apparatus includes: a memory storing computer program instructions; and a processor coupled to the memory and configured to execute the computer program instructions and perform: acquiring a time delay parameter corresponding to an advanced interactive data packet, and acquiring time delay monitoring information between the next generation nodeB and a user equipment; acquiring a transmission delay of the advanced interactive data packet on a network side in response to identifying that a data packet transmitted by a user plane function belongs to data sub-packets obtained by splitting the advanced interactive data packet; predicting, according to the time delay parameter, the time delay monitoring information, and the transmission delay of the advanced interactive data packet on the network side, whether transmitting the data sub-packets to the user equipment meets a time delay desirable; and stopping, in response to determining that transmitting the data sub-packets to the user equipment does not meet the time delay desirable, transmitting the data sub-packets obtained by splitting the advanced interactive data packet to the user equipment In yet another aspect, the present disclosure provides one or more computer-readable media, storing computer-readable instructions, the computer-readable instructions, when executed by a processor, implementing the data transmission method according to the embodiments.

In yet another aspect, the present disclosure provides an electronic device, including: one or more processors; and a storage apparatus, configured to store one or more computer-readable instructions, the one or more computer-readable instructions, when executed by the one or more processors, causing the one or more processors to implement the data transmission method according to the embodiments.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s)," "some embodiments," "certain embodiment(s)," or "certain embodiments" may refer to one or more subsets of all possible embodiments. When and as applicable, the term "an embodiment," "one embodiment," "some embodiment(s)," "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

"Plurality of" mentioned herein means two or more. And/or describes an association relationship for describing associated objects and represents that three relationships may exist. For example, A and/or B may represent the following three scenarios: Only A exists, both A and B exist, and only B exists. The character "/" generally indicates an "or" relationship between the associated objects.

With the development of 5G, many businesses that desire a large data volume and a short time delay have been employed. For example, cloud gaming business, VR, AR, MR, XR, CR and other interactive businesses can also be referred to as an Advanced Interactive Service (AIS) business.

Figure 1:
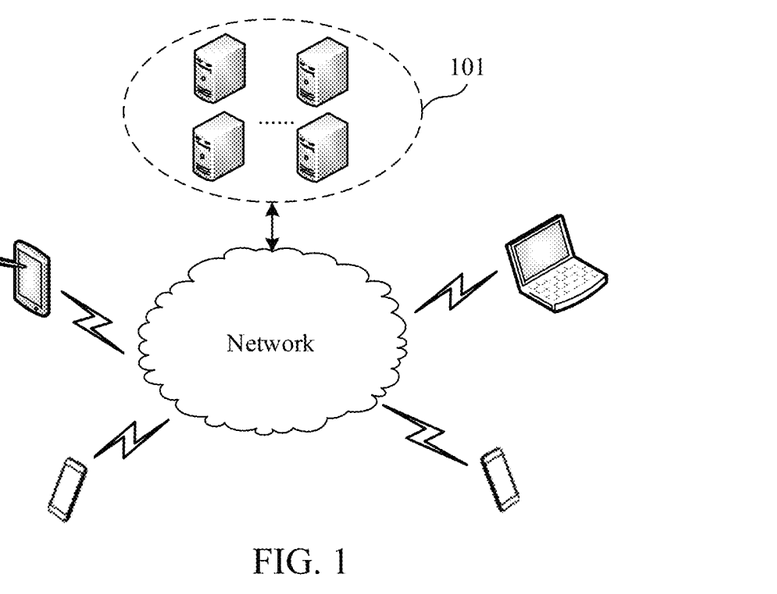
FIG. 1 shows a schematic diagram of an exemplary system architecture to which a technical solution according to an embodiment of the present disclosure is applicable.

For example, in a cloud gaming scenario shown in FIG. 1, a cloud server 101 is configured to run a cloud gaming. The cloud server 101 may render game images, encode audio signals and rendered images, and finally transmit the encoded data obtained by encoding processing to each game client through a network. The game client may be a user equipment with a streaming media playback capability, human-machine interaction capability and communication capability, such as a smart phone, a tablet computer, a notebook computer, a desktop computer, and a smart TV, etc.; or, the game client may be an application program running in a terminal device. In certain embodiment(s), the game client may decode the encoded data transmitted by the cloud server 101 to obtain analog audio and video signals, and play the same. It is understood that FIG. 1 is only an exemplary system architecture representing a cloud gaming system, and does not limit the specific architecture of the cloud gaming system. For example, in other embodiments, the cloud gaming system may also include a backend server for scheduling and the like. In addition, the cloud server 101 may be an independent physical server, or may be a server cluster or a distributed system formed by a plurality of physical servers, or may be a cloud server that provides a cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The game client and the cloud server 101 may be directly or indirectly connected in a wired or wireless communication manner. This is not limited in the present disclosure.

Figure 2:
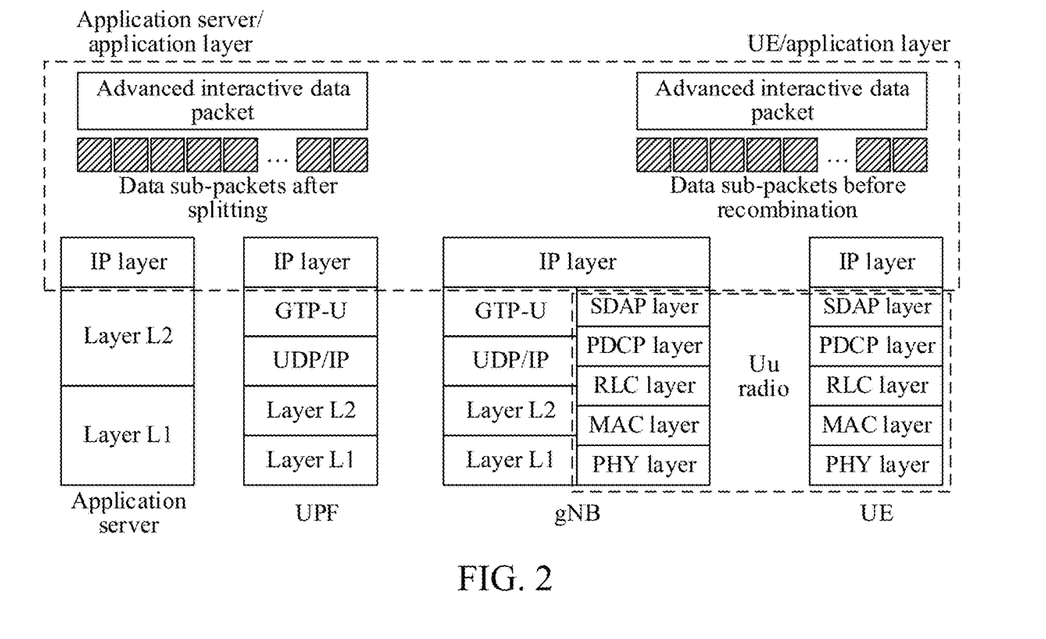
FIG. 2 shows a schematic diagram of a transmission process of an advanced interactive data packet according to one embodiment of the present disclosure.

In the above implementation scenarios of various advanced interactive businesses, an advanced interactive data packet may be split into a plurality of data sub-packets during transmission since it is huge. In certain embodiment(s), as shown in FIG. 2, in a 5G system, a user plane includes an application server, a User Plane Function (UPF), a next generation nodeB (gNB) and a User Equipment (UE). The advanced interactive data packet is transmitted in a downlink direction in some typical business scenarios, such as from the application server to the UPF, and from the gNB to the UE. During transmission, the advanced interactive data packet is split at an application layer of the application server. After the split data sub-packets arrive at the UPF from the application server as Internet Protocol (IP) packets, the 5G system transmits the data sub-packets to the UE through a Protocol Data Unit (PDU) session. The data sub-packets are upwards submitted step by step from a protocol stack at the UE, and are recombined to restore the advanced interactive data packet.

In the system shown in FIG. 2, layer L1 refers to a physical layer, which is used for ensuring that original data can be transmitted on various physical media; layer L2 refers to a data link layer, which provides a service to a network layer on the basis of a service provided by the physical layer; an IP layer is a network layer, used for achieving data transmission between two end systems; UDP is user datagram protocol; GTP-U is general packet radio service tunneling protocol; PHY is physical, which is referred to as physical layer in Chinese; MAC is Media Access Control; RLC is radio link control; PDCP is packet data convergence protocol; and SDAP is service data adaptation protocol.

In the aforementioned implementation scenario, the advanced interactive data packet generated by the application layer may be split into a large number of data sub-packets for transmission at an extremely short time delay. Once the transmission of one of the data sub-packets does not meet transmission desirables, the entire advanced interactive data packet cannot be restored and presented in real time at a receiving end, thus failing to meet the desirables of an advanced interactive high-bandwidth business. The segmented transmission of a large number of data sub-packets actually causes a waste of valuable network resources. In certain embodiment(s), assuming that an advanced interactive data packet is split into 10 data sub-packets (or even more data sub-packets), and the probability of successful transmission of each of the data sub-packets is 0.99, the probability of successful transmission of all of the 10 data sub-packets is $0.99^{10}$, namely 0.904. It can be seen that when an advanced interactive data packet is split into multiple data sub-packets, even if the probability of successful transmission of each of the data sub-packets is large, the probability of successful transmission of all the data sub-packets obtained by splitting the entire advanced interactive data packet will be greatly reduced. Not only that, if the transmission of the data sub-packet exceeds a time delay desirable, even if a receiver receives all the data sub-packets obtained by splitting the advanced interactive data packet, there is no may restore the advanced interactive data packet. It is meaningless to continue to transmit the data sub-packets obtained by splitting the advanced interactive data packet. Based on this, the embodiments of the present disclosure provide the following solutions.

Figure 3:
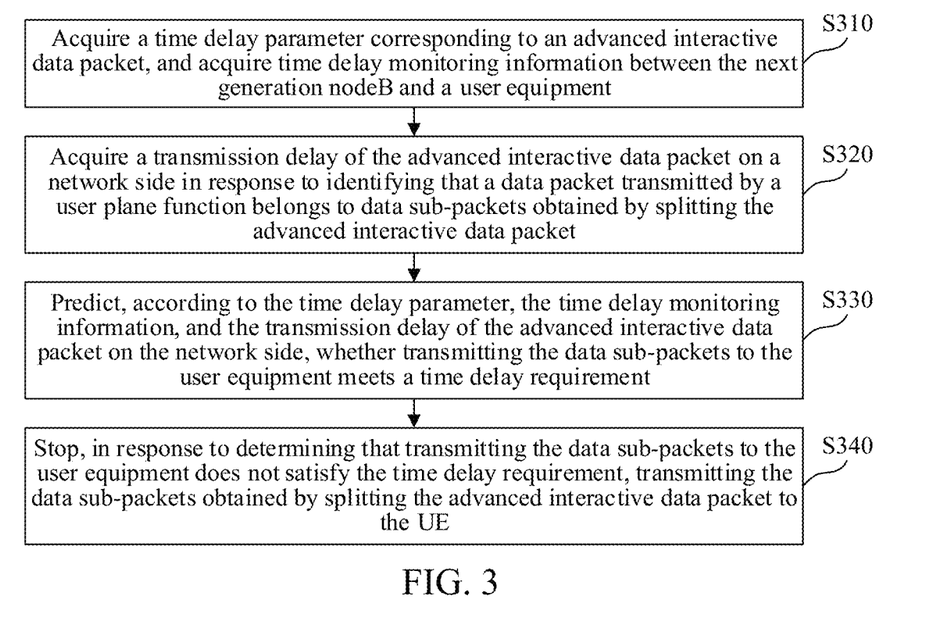
FIG. 3 shows a flowchart of a data transmission method according to one embodiment of the present disclosure.

FIG. 3 shows a flowchart of a data transmission method according to one embodiment of the present disclosure. The data transmission method may be implemented by a gNB. Referring to FIG. 3, the data transmission method at least includes S310 to S340, which are described in detail as follows.

In S310, a time delay parameter corresponding to an advanced interactive data packet is acquired, and time delay monitoring information between a gNB and a UE is acquired.

In one embodiment of the present disclosure, the time delay parameter corresponding to the advanced interactive data packet is configured by a network side. In certain embodiment(s), the gNB may receive a configuration signaling of the network side, and acquire the time delay parameter from the configuration signaling.

In one embodiment of the present disclosure, the time delay parameter corresponding to the advanced interactive data packet may also be determined according to a QoS flow identifier transmitted by the network side. In certain embodiment(s), for example, a correspondence relationship between the QoS flow identifier and the time delay parameter may be pre-stored, so that the corresponding time delay parameter may be determined on the basis of the QoS flow identifier when the QoS flow identifier transmitted by the network side is acquired.

In one embodiment of the present disclosure, the time delay parameter may also be acquired directly from a QoS parameter corresponding to the advanced interactive data packet. In certain embodiment(s), for standardized QoS parameters, the gNB may acquire the time delay parameter from the QoS parameters configured by a data flow according to the standard; and for non-standardized QoS parameters, the gNB may acquire the time delay parameter from a configuration of an operator.

In one embodiment of the present disclosure, the time delay parameter is used for indicating a time delay desirable of the advanced interactive data packet. In certain embodiment(s), the time delay parameter may include a maximum allowable delay of the advanced interactive data packet. It means that the advanced interactive data packet cannot meet the time delay desirable during transmission if the transmission of the advanced interactive data packet exceeds the maximum allowable delay. Conversely, it means that the advanced interactive data packet can meet the time delay desirable during transmission if the transmission of the advanced interactive data packet does not exceed the maximum allowable delay. The maximum allowable delay is used for representing a time delay threshold, which may be set according to actual business desirables.

In one embodiment of the present disclosure, the process of acquiring the time delay monitoring information between the gNB and the UE may be: monitoring time delay information of a plurality of communication links between the gNB and the UE; and calculating an average value of the monitored time delay information of the plurality of communication links, and taking the average value as the time delay monitoring information.

In one embodiment of the present disclosure, during the monitoring time delay information of a plurality of communication links between the gNB and the UE, time delay information between the gNB and the UE on a plurality of DRBs may be respectively monitored; or, time delay information between the gNB and the UE on a plurality of logic channels may be respectively monitored; or, time delay information between the gNB and the UE on a plurality of logic channel groups may be respectively monitored.

Continuing to refer to FIG. 3, in S320, a transmission delay of the advanced interactive data packet on a network side is acquired in response to identifying that a data packet transmitted by a UPF belongs to data sub-packets obtained by splitting the advanced interactive data packet.

The UPF is an entity used for implementing functions of a user plane. The functions of the user plane are functional operations completed on a user side.

In one embodiment, the UPF may include a user plane gateway. The user plane gateway is a gateway that provides services for the user side.

In one embodiment of the present disclosure, the plurality of data sub-packets obtained by splitting the advanced interactive data packet includes a start data packet and an end data packet. The start data packet contains first indication information, the first indication information being used for indicating that the start data packet is a first transmitted data sub-packet of the plurality of data sub-packets; and the end data packet contains second indication information, the second indication information being used for indicating that the end data packet is a last transmitted data sub-packet of the plurality of data sub-packets. According to the technical solution of this embodiment, whether the data sub-packets obtained by splitting the advanced interactive data packet are received may be determined by identifying the start data packet and the end data packet. For example, if the start data packet is identified according to the first indication information contained in the start data packet, the data packets from the start data packet to the end data packet belong to the data sub-packets obtained by splitting the advanced interactive data packet.

In one embodiment of the present disclosure, whether the received data packet belongs to the data sub-packets obtained by splitting the advanced interactive data packet may be identified according to the indication information contained in a protocol field of a received data packet. In certain embodiment(s), for example, if indication information used for indicating the start data packet is added in the protocol field of the start data packet in the data sub-packets obtained by splitting the advanced interactive data packet, and indication information used for indicating the end data packet is added in the protocol field of the end data packet, after the start data packet is identified according to the protocol field of the data packet, the data packets from the start data packet to the end data packet all belong to the data sub-packets obtained by splitting the advanced interactive data packet.

In one embodiment of the present disclosure, whether the received data packet belongs to the data sub-packets obtained by splitting the advanced interactive data packet may be identified according to indication information contained in payload information of a received data packet. In certain embodiment(s), for example, if indication information used for indicating the start data packet is added in the payload information of the start data packet in the data sub-packets obtained by splitting the advanced interactive data packet, and indication information used for indicating the end data packet is added in the payload information of the end data packet, after the start data packet is identified according to the payload information of the data packet, the data packets from the start data packet to the end data packet all belong to the data sub-packets obtained by splitting the advanced interactive data packet.

In one embodiment of the present disclosure, the gNB may interact with the UPF to acquire the transmission delay of the advanced interactive data packet on the network side, the transmission delay including a dynamic delay or a static delay. The static delay is a fixed delay that does not change over time. The dynamic delay is a dynamically changing delay.

In one embodiment of the present disclosure, if the transmission delay of the advanced interactive data packet on the network side is the dynamic delay, the transmission delay of the advanced interactive data packet on the network side may be determined according to time stamp information carried in each of the data sub-packets transmitted by the UPF and obtained by splitting the advanced interactive data packet. In this embodiment, each of the data sub-packets may carry time information, and the gNB may determine the transmission delay of the advanced interactive data packet on the network side according to the time stamp information carried by each of the data sub-packets.

In one embodiment of the present disclosure, if the transmission delay of the advanced interactive data packet on the network side is the dynamic delay, the transmission delay of the advanced interactive data packet on the network side may be determined according to overall time stamp information transmitted by the UPF for the advanced interactive data packet. In this embodiment, it is not necessary that each of the data sub-packets carries the time information, but the entire advanced interactive data packet has one piece of overall time stamp information, so that the gNB may determine the transmission delay of the advanced interactive data packet on the network side according to the overall time stamp information of the advanced interactive data packet. In one embodiment, the overall time stamp information may be located in the start data packet or the end data packet obtained by splitting the advanced interactive data packet.

In S330, whether transmitting the data sub-packets to the user equipment meets a time delay desirable is predicted according to the time delay parameter, the time delay monitoring information, and the transmission delay of the advanced interactive data packet on the network side.

In one embodiment of the present disclosure, if it is determined, according to the transmission delay of the advanced interactive data packet on the network side and the time delay monitoring information between the gNB and the UE, that the overall delay of the transmission of the advanced interactive data packet from the network side to the UE is greater than the maximum allowable delay contained in the time delay parameter, it indicates that transmitting the data sub-packets obtained by splitting the advanced interactive data packet to the UE cannot meet the time delay desirable. On the contrary, if it is determined, according to the transmission delay of the advanced interactive data packet on the network side and the time delay monitoring information between the gNB and the UE, that the overall delay of the transmission of the advanced inter- active data packet from the network side to the UE is less than or equal to the maximum allowable delay contained in the time delay parameter, it indicates that transmitting the data sub-packets obtained by splitting the advanced interactive data packet to the UE can meet the time delay desirable.

In one embodiment of the present disclosure, since the time delay monitoring information between the gNB and the UE changes, the gNB may possibly predict, during transmission of some data sub-packets, that transmitting these data sub-packets to the UE can meet the time delay desirable, and predict, during transmission of some other data packets, that transmitting these data sub-packets to the UE cannot meet the time delay desirable.

In S340, transmitting the data sub-packets obtained by splitting the advanced interactive data packet to the UE is stopped in response to determining that transmitting the data sub-packets to the user equipment does not meet the time delay desirable.

In this embodiment of the present disclosure, since the advanced interactive data packet has a time delay desirable, it is meaningless to continue to transmit the remaining data sub-packets if it is determined that transmitting the data sub-packets to the UE cannot meet the time delay desirable. Therefore, transmitting the remaining data sub-packets obtained by splitting the advanced interactive data packet to the UE may be stopped, so as to reduce the occupancy of a bandwidth, which is favorable for reducing the occupancy of transmission resources during the transmission of the advanced interactive data packet.

In one embodiment of the present disclosure, if it is determined that transmitting the data sub-packets to the UE can meet the time delay desirable, after the data sub-packet is successfully transmitted, a next data sub-packet is continued to be transmitted until all the data sub-packets obtained by splitting the advanced interactive data packet are transmitted.

In one embodiment of the present disclosure, if it is determined that transmitting the data sub-packets to the UE cannot meet the time delay desirable, the received data sub-packets obtained by splitting the advanced interactive data packet may also be abandoned to reduce the occupancy of storage resources.

In one embodiment of the present disclosure, if it is determined that transmitting the data sub-packets to the UE cannot meet the time delay desirable, feedback information may be transmitted to the UPF. The feedback information is used for instructing the UPF to stop transmitting the data sub-packets obtained by splitting the advanced interactive data packet. According to the technical solution of this embodiment, when transmitting the data sub-packets to the UE cannot meet the time delay desirable, the feedback information may be transmitted to the UPF to instruct the UPF to stop transmitting the remaining data sub-packets, so as to avoid the occupancy of transmission resources.

In one embodiment, the UPF transmits the feedback information when or in response to a determination that all the data sub-packets obtained by splitting the advanced interactive data packet are not completely received. It is not necessary to transmit the feedback information to the UPF if all the data sub-packets obtained by splitting the advanced interactive data packet have been received.

In one embodiment of the present disclosure, if it is detected that there is a data sub-packet, failed to be transmitted to the UE, among the data sub-packets obtained by splitting the advanced interactive data packet, transmitting the remaining data sub-packets obtained by splitting the advanced interactive data packet to the UE is stopped. In this embodiment, if it is detected that there is a data sub-packet, failed to be transmitted to the UE, among the data sub-packets obtained by splitting the advanced interactive data packet, continuing to transmit the remaining data sub-packets obtained by splitting the advanced interactive data packet to the UE will not restore the advanced interactive data packet. Therefore, transmitting the remaining data sub-packets to the UE may be stopped, so as to reduce the occupancy of the bandwidth, which is conductive to reducing the occupancy of the transmission resources during the transmission of the advanced interactive data packet.

To sum up, according to the technical solutions of the embodiments of the present disclosure, the gNB may determine, through prediction and analysis, whether the transmission delay of the data sub-packets obtained by splitting the advanced interactive data packet exceeds the maximum allowable delay, so as to determine whether to abandon the received data sub-packets and whether to stop the transmission to the UE. Wireless network resources are saved.

As shown in FIG. 2, the gNB has a dual protocol stack function, and a GTP-U tunnel based on an N3 interface receives a business flow from the UPF, such as an XR business flow rendered by the cloud. With the increasing resolution and frame rate of this type of business flow, it is easy to form huge data packets. After these data packets are split by the application layer, in order to adapt to an end-to-end network, each segmented data packet (that is, a data sub-packet after splitting) usually does not exceed the size of a Maximum Transmission Unit (MTU). Furthermore, a larger data packet will be split into more segmented data packets. At the same time, these segmented data packets may all be successfully transmitted to the receiving end before they can be correctly restored and processed. Loss of any data packet can easily cause an entire huge IP data packet to fail to be restored. Transmitting the data sub-packets may result in a waste of resources. In addition, an extremely high time delay desirable of data packet transmission is put forward to an advanced interactive business, and the result of exceeding the transmission time delay is the same as the result of packet loss. Therefore, the data packets that are lost or do not meet the time delay desirable may be abandoned, and the segmented data packets of the advanced interactive data packet that have not been transmitted may be abandoned no matter they are positioned in a cache of the gNB or they are still positioned in a cache of the UPF.

Figure 4:
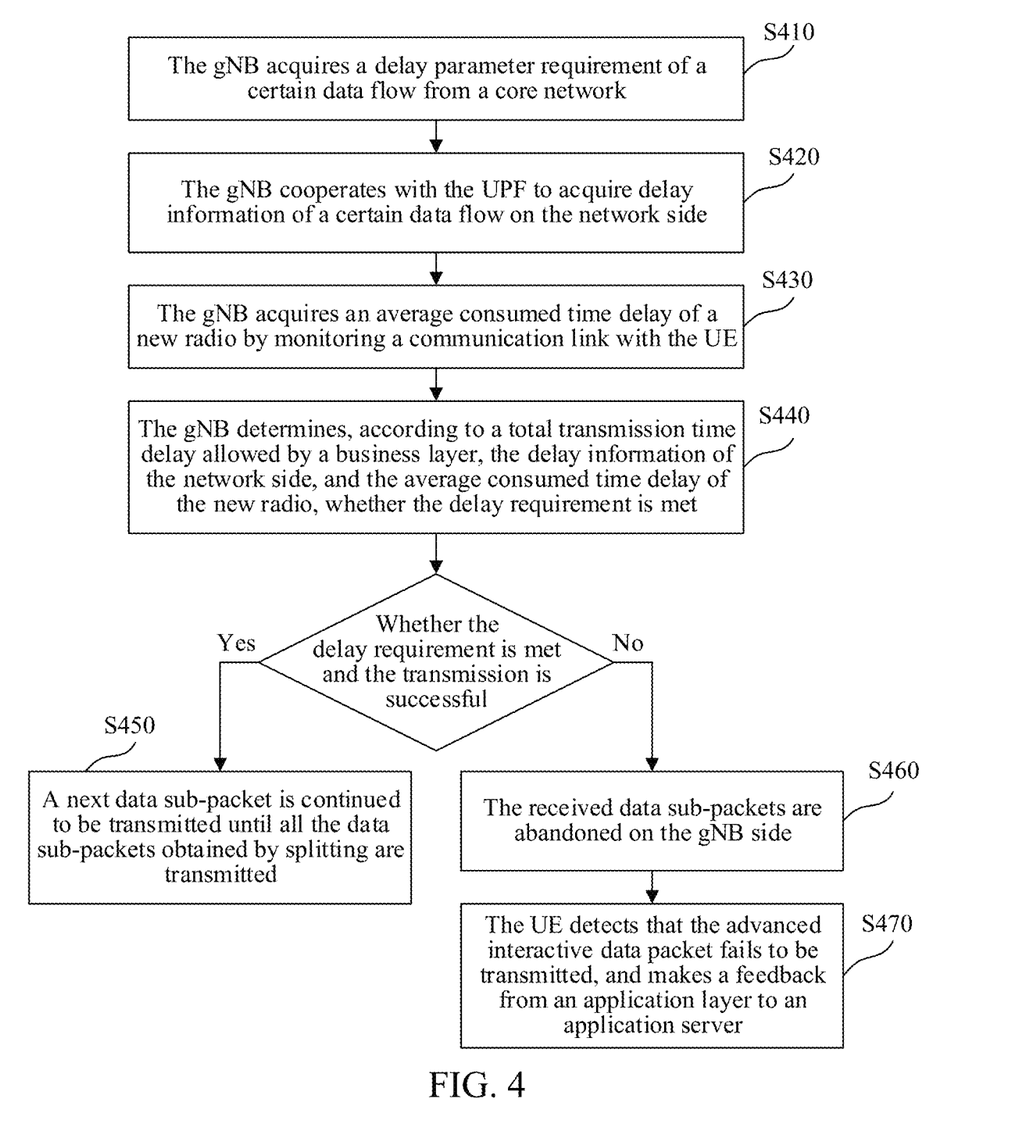
FIG. 4 shows a schematic diagram of a transmission process of an advanced interactive data packet according to one embodiment of the present disclosure.

As shown in FIG. 4, a specific implementation process may include:

S410. The gNB acquires a delay parameter desirable of a certain data flow from a core network.

In one embodiment of the present disclosure, the delay parameter desirable acquired by the gNB from the core network may be an end-to-end packet delay budget (PDB). This parameter may be configured by a dynamic signaling, or may be derived inversely according to QoS parameter information of the data flow. For example, a correspondence relationship between the QoS parameter information and the time delay parameter may be pre-stored, so that the corresponding time delay parameter may be determined on the basis of the QoS parameter information when the QoS parameter information transmitted by the network side is acquired. For a 5G system, the QoS parameter information may be a 5G QoS identifier (5QI).

In one embodiment of the present disclosure, for a standardized 5QI parameter, the gNB may acquire, according to the standard, the end-to-end PDB from the 5QI parameter configured by the data flow; and for a non-standardized 5QI, the gNB may acquire the end-to-end PDB according to a configuration of an operator.

S420. The gNB cooperates with the UPF to acquire delay information of a certain data flow on the network side.

In one embodiment of the present disclosure, the delay between the gNB and the UPF may be static or dynamic. If the delay is a static delay, the gNB directly subtracts the delay between the gNB and the UPF from the end-to-end PDB to obtain time for processing the interactive data packet. If the delay is a dynamic delay, the gNB may estimate the delay through a time stamp mechanism negotiated between the gNB and the UPF or by dynamically monitoring a delay between the UPF and the gNB through an in-band manner. For example, the in-band manner may estimate a protocol header part, a payload part and the like of a data packet through the carried time stamp information.

In one embodiment of the present disclosure, the time stamp mechanism may be a time stamp obtained by each of the data sub-packets itself from the UPF. In this way, a time delay tolerance of each of the data sub-packets may be determined, rather than monitoring the entire huge IP packet.

In one embodiment of the present disclosure, the time stamp mechanism may also be that the UPF provides an overall time stamp for an advanced interactive data packet, and the gNB determines, using the same time stamp, whether a string of associated data sub-packets obtained by splitting the advanced interactive data packet meets a time delay desirable.

S430. The gNB acquires an average consumed time delay of a new radio by monitoring a communication link with the UE.

In one embodiment of the present disclosure, the gNB can monitor a time delay on a radio side according to DRBs, logic channels or logic channel groups, so as to estimate whether each of data sub-packets obtained by splitting an advanced interactive data packet is successfully transmitted within a time delay desirable. It is not necessary to introduce a new signaling in such prediction, but a signaling may be counted and obtained from other business flows similar to a 5QI or QoS level.

S440. The gNB determines, according to a total transmission time delay allowed by a business layer, delay information of the network side, and the average consumed time delay of the new radio, whether the time delay desirable is met and the transmission is successful; if the time delay desirable is met and the transmission is successful, S450 is executed, otherwise, S460 is executed.

In one embodiment of the present disclosure, if it is determined, according to the delay information of the advanced interactive data packet on the network side and the average consumed time delay of the new radio, that the overall delay of transmission of the advanced interactive data packet from the network side to the UE is greater than the total transmission time delay allowed by the business layer, it indicates that transmitting the data sub-packets obtained by splitting the advanced interactive data packet to the UE cannot meet the time delay desirable.

S450. If the time delay desirable is met and the transmission is successful, a next data sub-packet is continued to be transmitted until all the data sub-packets obtained by splitting are transmitted.

S460. If the time delay desirable is not met and the transmission fails, the received data sub-packets are abandoned on the gNB side. At this time, other data sub-packets transmitted by the UPF are no longer transmitted to the UE.

S470. The UE detects that the advanced interactive data packet fails to be transmitted, and makes a feedback from an application layer to an application server. In one embodiment, if the UE does not completely receive all the data sub-packets of the advanced interactive data packet within a certain time limit, it may determine that the advanced interactive data packet fails to be transmitted. The information fed back to the application server is used for indicating that the advanced interactive data packet has failed to be transmitted.

Figure 5:
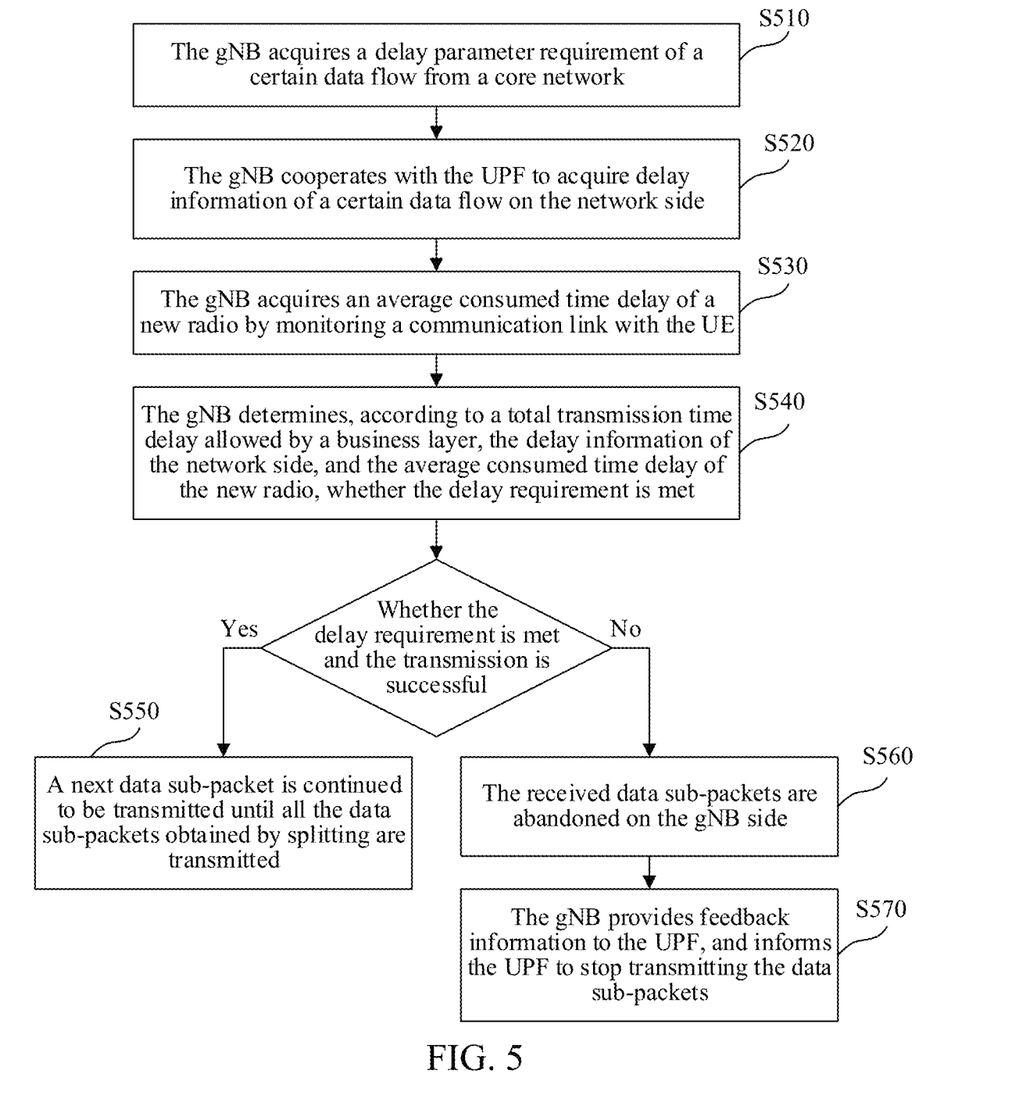
FIG. 5 shows a schematic diagram of a transmission process of an advanced interactive data packet according to one embodiment of the present disclosure.

In the technical solution of this embodiment shown in FIG. 4, the gNB is not desired to indicate to the UPF the transmission of the advanced interactive data packet, but the UE may indicate the failure of the transmission of the advanced interactive data packet from the application layer to the application server. In another embodiment, as shown in FIG. 5, the specific implementation process includes the following steps:

S510. The gNB acquires a delay parameter desirable of a certain data flow from a core network.

In one embodiment of the present disclosure, the delay parameter desirable acquired by the gNB from the core network may be an end-to-end PDB. This parameter may be configured by a dynamic signaling, or may be derived inversely according to QoS parameter information of the data flow. For example, a correspondence relationship between the QoS parameter information and the time delay parameter may be pre-stored, so that the corresponding time delay parameter may be determined on the basis of the QoS parameter information when the QoS parameter information transmitted by the network side is acquired. For a 5G system, the QoS parameter information may be a 5QI.

In one embodiment of the present disclosure, for a standardized 5QI parameter, the gNB may acquire, according to the standard, the end-to-end PDB from the 5QI parameter configured by the data flow; and for a non-standardized 5QI, the gNB may acquire the end-to-end PDB according to a configuration of an operator.

S520. The gNB cooperates with the UPF to acquire delay information of a certain data flow on the network side.

In one embodiment of the present disclosure, the delay between the gNB and the UPF may be static or dynamic. If the delay is a static delay, the gNB directly subtracts the delay between the gNB and the UPF from the end-to-end PDB to obtain time for processing the interactive data packet. If the delay is a dynamic delay, the gNB may estimate the delay through a time stamp mechanism negotiated between the gNB and the UPF or by dynamically monitoring a delay between the UPF and the gNB through an in-band manner. For example, the in-band manner may estimate a protocol header part, a payload part and the like of a data packet through the carried time stamp information.

In one embodiment of the present disclosure, the time stamp mechanism may be a time stamp obtained by each of the data sub-packets itself from the UPF. In this way, a time delay tolerance of each of the data sub-packets may be determined, rather than monitoring the entire huge IP packet.

In one embodiment of the present disclosure, the time stamp mechanism may also be that the UPF provides an overall time stamp for an advanced interactive data packet, and the gNB determines, using the same time stamp, whether a string of associated data sub-packets obtained by splitting the advanced interactive data packet meets a time delay desirable.

S530. The gNB acquires an average consumed time delay of a new radio by monitoring a communication link with the UE.

In one embodiment of the present disclosure, the gNB can monitor a time delay on a radio side according to DRBs, logic channels or logic channel groups, so as to estimate whether each of data sub-packets obtained by splitting an advanced interactive data packet is successfully transmitted within a time delay desirable. It is not necessary to introduce a new signaling in such prediction, but a signaling may be counted and obtained from other business flows similar to a 5QI or QoS level.

S540. The gNB determines, according to a total transmission time delay allowed by a business layer, delay information of the network side, and the average consumed time delay of the new radio, whether the time delay desirable is met and the transmission is successful; if the time delay desirable is met and the transmission is successful, S550 is executed, otherwise, S560 is executed.

In one embodiment of the present disclosure, if it is determined, according to the delay information of the advanced interactive data packet on the network side and the average consumed time delay of the new radio, that the overall delay of transmission of the advanced interactive data packet from the network side to the UE is greater than the total transmission time delay allowed by the business layer, it indicates that transmitting the data sub-packets obtained by splitting the advanced interactive data packet to the UE cannot meet the time delay desirable.

S550. If the time delay desirable is met and the transmission is successful, a next data sub-packet is continued to be transmitted until all the data sub-packets obtained by splitting are transmitted.

S560. If the time delay desirable is not met and the transmission fails, the received data sub-packets are abandoned on the gNB side. At this time, other data sub-packets transmitted by the UPF are no longer transmitted to the UE.

S570. The gNB provides feedback information to the UPF, and informs the UPF to stop transmitting the data sub-packets. If the gNB has received all the data sub-packets obtained by splitting the advanced interactive data packet, no more feedback information will be provided for the UPF.

In one embodiment of the present disclosure, the technical solutions of the embodiments shown in FIG. 4 and FIG. 5 may also be combined. That is, the UE makes the feedback from the application layer to the application server when detecting that the advanced interactive data packet fails to be transmitted; and after determining that the transmission fails, the gNB may also provide the feedback information for the UPF to inform the UPF to stop transmitting the data sub-packets.

Figure 6:
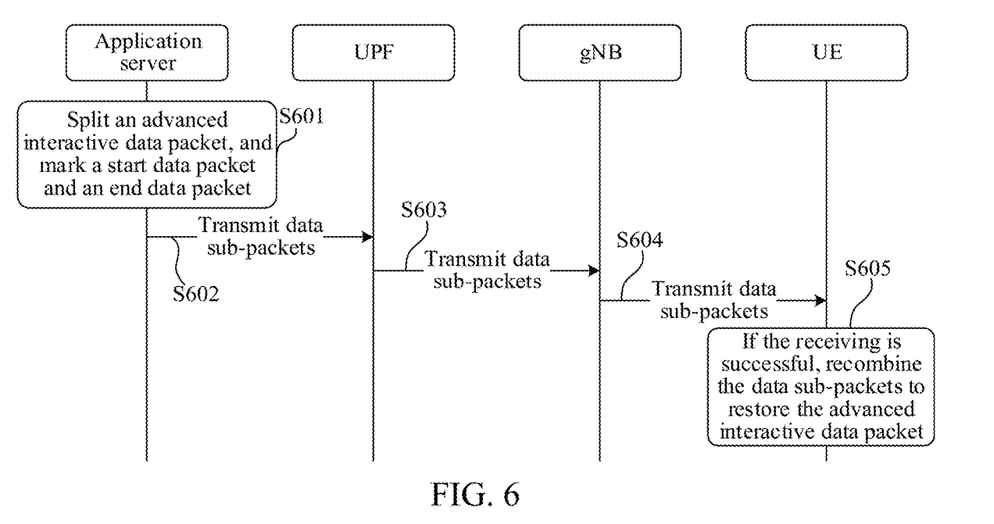
FIG. 6 shows a schematic diagram of a transmission process of an advanced interactive data packet according to one embodiment of the present disclosure.

To sum up, in one embodiment of the present disclosure, an interaction process among the application server, the UPF, the gNB and the UE is as shown in FIG. 6, In certain embodiment(s) including:

S601. The application server splits an advanced interactive data packet to obtain data sub-packets, and marks a start data packet and an end data packet.

In one embodiment of the present disclosure, indication information may be added to the start data packet and the end data packet to indicate which data sub-packet is the start data packet and which data sub-packet is the end data packet. In one embodiment, the indication information may be added in a protocol field or payload information of a data packet. For example, the indication information is added in a field of a GTP-U.

S602. The application server transmits the data sub-packets to the UPF.

In one embodiment of the present disclosure, when the application server transmits the data sub-packets obtained by splitting to the UPF, the UPF may identify the start data packet and the end data packet.

S603. The UPF transmits the data sub-packets to the gNB.

In one embodiment of the present disclosure, the process of transmitting the data sub-packets by the UPF to the gNB and the process of transmitting the data sub-packets by the application server to the UPF may be carried out synchronously. For example, the UPF may transmit the data sub-packets to the gNB after receiving the data sub-packets (not all the data sub-packets have been received yet) transmitted by the application server. This manner can reduce the delay of the data packets arriving at the UE. In certain embodiment(s), the UPF may also transmit the data sub-packets to the gNB after receiving all the data sub-packets transmitted by the application server. This manner avoids the following problem: transmission resources are wasted by invalidity of the data sub-packets transmitted first to the gNB because of an error in the receiving process of the UPF.

In one embodiment of the present disclosure, in the process of transmitting the data sub-packets obtained by splitting the advanced interactive data packet to the gNB, if the UPF detects that the data sub-packets obtained by splitting a certain type of advanced interactive data packet fail to be transmitted or detects that the transmission of the data sub-packets exceeds the time delay desirable, the UPF may stop transmitting the remaining data sub-packets of this type of advanced interactive data packet to the gNB, so as to avoid the occupancy of the transmission resources caused by continuous transmission. The UPF may also delete the received data sub-packets obtained by splitting this type of advanced interactive data packet, and the UPF may also inform the application server to stop transmitting the data sub-packets obtained by splitting this type of advanced interactive data packet to the UPF.

In one embodiment of the present disclosure, the UPF may also stop transmitting the data sub-packets obtained by splitting this type of advanced interactive data packet to the gNB when not receiving, within a certain period of time, all the data sub-packets obtained by splitting a certain type of advanced interactive data packet transmitted by the application server; the UPF may also delete the received data sub-packets obtained by splitting this type of advanced interactive data packet; and in addition, the UPF may also inform the application server to stop transmitting the data sub-packets obtained by splitting this type of advanced interactive data packet to the UPF.

S604. The gNB transmits the data sub-packets to the UE.

In one embodiment of the present disclosure, the process of transmitting the data sub-packets by the gNB to the UE and the process of transmitting the data sub-packets by the UPF to the gNB may be carried out synchronously. For example, the gNB may transmit the data sub-packets to the UE after receiving the data sub-packets (not all the data sub-packets have been received yet) transmitted by the UPF. This manner can reduce the delay of the data packets arriving at the UE. In certain embodiment(s), the gNB may also transmit the data sub-packets to the UE after receiving all the data sub-packets transmitted by the UPF. This manner avoids the following problem: transmission resources are wasted by invalidity of the data sub-packets transmitted first to the UE because of an error in the receiving process of the gNB.

In one embodiment of the present disclosure, in the process of transmitting the data sub-packets obtained by splitting the advanced interactive data packet to the UE, if the gNB detects that the data sub-packets obtained by splitting a certain type of advanced interactive data packet fail to be transmitted or determines, through prediction, that transmitting the data sub-packets to the UE does not meet the time delay desirable, the gNB may stop transmitting the remaining data sub-packets obtained by splitting this type of advanced interactive data packet to the UE, so as to avoid the occupancy of the transmission resources caused by continuous transmission. The gNB may also delete the received data sub-packets obtained by splitting this type of advanced interactive data packet, and the gNB may also inform the UPF to stop transmitting the data sub-packets obtained by splitting this type of advanced interactive data packet to the gNB.

In one embodiment of the present disclosure, the gNB may also stop transmitting the data sub-packets obtained by splitting this type of advanced interactive data packet to the UE when not receiving, within a certain period of time, all the data sub-packets obtained by splitting a certain type of advanced interactive data packet transmitted by the UPF; the gNB may also delete the received data sub-packets obtained by splitting this type of advanced interactive data packet; and in addition, the gNB may also inform the UPF to stop transmitting the data sub-packets obtained by splitting this type of advanced interactive data packet to the gNB.

S605. If the UE succeeds in receiving all the data sub-packets, the UE recombines the data sub-packets to restore the advanced interactive data packet.

In one embodiment of the present disclosure, if the UE detects that a certain type of advanced interactive data packet fails to be transmitted, the UE may make a feedback from the application layer to the application server. In one embodiment, if the UE does not completely receive all the data sub-packets of a certain type of advanced interactive data packet within a certain time limit, it may determine that this type of advanced interactive data packet fails to be transmitted. The information fed back to the application server is used for indicating that this type of advanced interactive data packet has failed to be transmitted.

In the technical solutions of the embodiments of the present disclosure, the gNB may predict the transmission time delay of the data sub-packets during the transmission, so that the occupancy of a bandwidth caused by continuous transmission of the remaining data sub-packets to the UE can be avoided when or in response to a determination that the transmission of the data sub-packets does not meet the time delay desirable, and it is favorable for reducing the occupancy of the transmission resources during the transmission of the advanced interactive data packet.

The following describes apparatus embodiments of the present disclosure, which can be used to implement the data transmission method in the embodiments of the present disclosure. For details undisclosed in the apparatus embodiments of the present disclosure, refer to the embodiments of the data transmission method in the present disclosure.

Figure 7:
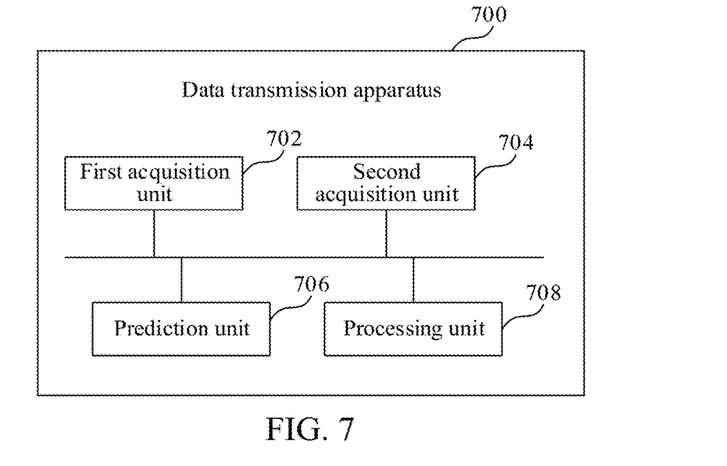
FIG. 7 shows a block diagram of a data transmission apparatus according to one embodiment of the present disclosure.

FIG. 7 shows a block diagram of a data transmission apparatus according to one embodiment of the present disclosure. The data transmission apparatus may be arranged inside a gNB.

Referring to FIG. 7, a data transmission apparatus 700 according to one embodiment of the present disclosure includes a first acquisition unit 702, a second acquisition unit 704, a prediction unit 706 and a processing unit 708.

The first acquisition unit 702 is configured to acquire a time delay parameter corresponding to an advanced interactive data packet, and acquire time delay monitoring information between the next generation nodeB and a user equipment; the second acquisition unit 704 is configured to acquire a transmission delay of the advanced interactive data packet on a network side in response to identifying that a data packet transmitted by a user plane function belongs to data sub-packets obtained by splitting the advanced interactive data packet; the prediction unit 706 is configured to predict, according to the time delay parameter, the time delay monitoring information, and the transmission delay of the advanced interactive data packet on the network side, whether transmitting the data sub-packets to the user equipment meets a time delay desirable; and the processing unit 708 is configured to stop, in response to determining that transmitting the data sub-packets to the user equipment does not meet the time delay desirable, transmitting the data sub-packets obtained by splitting the advanced interactive data packet to the user equipment.

In some embodiments of the present disclosure, based on the solution, the first acquisition unit 702 is further configured to perform any of the following actions: receiving a configuration signaling of the network side, and acquiring the time delay parameter from the configuration signaling; determining the time delay parameter according to a QoS flow identifier transmitted by the network side; and acquiring the time delay parameter from a QoS parameter corresponding to the advanced interactive data packet.

In some embodiments of the present disclosure, based on the solution, the second acquisition unit 704 is further configured to perform interaction with the user plane function to acquire the transmission delay of the advanced interactive data packet on the network side, the transmission delay including a dynamic delay or a static delay.

In some embodiments of the present disclosure, based on the solution, the transmission delay of the advanced interactive data packet on the network side is the dynamic delay, and the second acquisition unit 704 is further configured to perform any of the following actions:

determining the transmission delay of the advanced interactive data packet on the network side according to time stamp information carried in each of the data sub-packets transmitted by the user plane function and obtained by splitting the advanced interactive data packet; and determining the transmission delay of the advanced interactive data packet on the network side according to overall time stamp information transmitted by the user plane function for the advanced interactive data packet.

In some embodiments of the present disclosure, based on the solution, the first acquisition unit 702 is further configured to monitor time delay information of a plurality of communication links between the next generation nodeB and the user equipment; and calculate an average value of the monitored time delay information of the plurality of communication links, and take the average value as the time delay monitoring information.

In some embodiments of the present disclosure, based on the solution, the first acquisition unit 702 is further configured to perform any of the following actions: respectively monitoring time delay information between the next generation nodeB and the user equipment on a plurality of DRBs; respectively monitoring time delay information between the next generation nodeB and the user equipment on a plurality of logic channels; and respectively monitoring time delay information between the next generation nodeB and the user equipment on a plurality of logic channel groups.

In some embodiments of the present disclosure, based on the solution, the processing unit 708 is further configured to abandon, in response to determining that transmitting the data sub-packets to the user equipment does not meet the time delay desirable, the received data sub-packet obtained by splitting the advanced interactive data packet.

In some embodiments of the present disclosure, based on the solution, the processing unit 708 is further configured to transmit feedback information to the user plane function in response to determining that transmitting the data sub-packets to the user equipment does not meet the time delay desirable, the feedback information being used for indicating the user plane function that the transmission of the advanced interactive data packet does not meet the time delay desirable.

In some embodiments of the present disclosure, based on the solution, the processing unit 708 is further configured to transmit the feedback information to the user plane function when or in response to a determination that all the data sub-packets obtained by splitting the advanced interactive data packets are not completely received.

In some embodiments of the present disclosure, based on the solution, the plurality of data sub-packets obtained by splitting the advanced interactive data packet includes a start data packet and an end data packet; the start data packet contains first indication information, the first indication information being used for indicating that the start data packet is a first transmitted data sub-packet of the plurality of data sub-packets; and the end data packet contains second indication information, the second indication information being used for indicating that the end data packet is a last transmitted data sub-packet of the plurality of data sub-packets.

In some embodiments of the present disclosure, based on the solution, the second acquisition unit 704 is further configured to perform any of the following actions: identifying, according to indication information contained in a protocol field of a received data packet, whether the received data packet belongs to the data sub-packets obtained by splitting the advanced interactive data packet; and identifying, according to indication information contained in payload information of a received data packet, whether the received data packet belongs to the data sub-packets obtained by splitting the advanced interactive data packet.

In some embodiments of the present disclosure, based on the solution, the processing unit 708 is further configured to stop, in response to detecting that there is a data sub-packet, failed to be transmitted to the user equipment, among the data sub-packets obtained by splitting the advanced interactive data packet, transmitting the remaining data sub-packets obtained by splitting the advanced interactive data packet to the user equipment.

Figure 8:
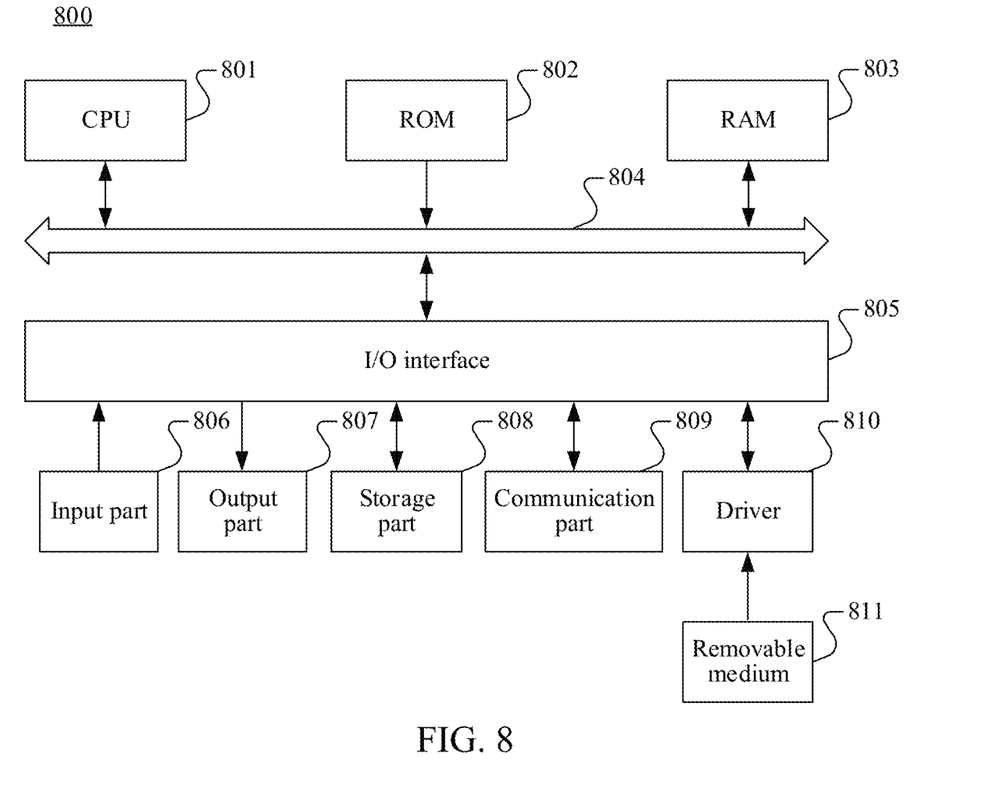
FIG. 8 is a schematic structural diagram of a computer system applicable for implementing an electronic device according to an embodiment of the present disclosure.

FIG. 8 is a schematic structural diagram of a computer system applicable for implementing an electronic device according to an embodiment of the present disclosure.

A computer system 800 of the electronic device shown in FIG. 8 is merely an example, and does not constitute any limitation on functions and use ranges of the embodiments of the present disclosure.

As shown in FIG. 8, the computer system 800 includes a central processing unit (CPU) 801, which can execute various appropriate actions and processing according to a program stored in a read-only memory (ROM) 802 or a program loaded from a storage part 808 to a random access memory (RAM) 803, such as performing the methods described in the embodiments. The RAM 803 further stores various programs and data desired for operating the system. The CPU 801, the ROM 802, and the RAM 803 are connected to each other through a bus 804. An input/output (I/O) interface 805 is also connected to the bus 804.

The following components are connected to the I/O interface 805: an input part 806 including a keyboard, a mouse, or the like; an output part 807 including a cathode ray tube (CRT), a liquid crystal display (LCD), a speaker, or the like; a storage part 808 including a hard disk, or the like; and a communication part 809 including a network interface card such as a local area network (LAN) card or a modem. The communication part 809 performs communication processing by using a network such as the Internet. A drive 810 is also connected to the I/O interface 805 as desired. A removable medium 811, such as a magnetic disk, an optical disc, a magneto-optical disk, or a semiconductor memory, is mounted on the driver 810 as desired, so that a computer-readable instruction read from the removable medium is installed into the storage part 808 as desired.

Particularly, according to an embodiment of the present disclosure, the processes described above by referring to the flowcharts may be implemented as computer program product. For example, an embodiment of the present disclosure includes a computer program product, including computer-readable instructions stored in a computer-readable medium, the computer-readable instructions including a computer-readable instruction used for performing a method shown in the flowchart. In such an embodiment, the computer-readable instruction may be downloaded and installed from a network through the communication part 809, and/or installed from the removable medium 811. When the computer-readable instruction is executed by the CPU 801, the various functions defined in the system of the present disclosure are executed.

The computer-readable medium shown in the embodiments of the present disclosure may be a computer-readable signal medium or a computer-readable storage medium or any combination thereof. The computer-readable storage medium may be, for example, but is not limited to, an electrical, magnetic, optical, electromagnetic, infrared, or semiconductor system, apparatus, or device, or any combination thereof. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In the present disclosure, the computer-readable storage medium may be any tangible medium containing or storing a program, and the program may be used by or used in combination with an instruction execution system, an apparatus, or a device. In the present disclosure, a computer-readable signal medium may include a data signal in a baseband or propagated as a part of a carrier wave, the data signal carrying a computer-readable instruction. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The computer-readable instruction included in the computer-readable medium may be transmitted by using any suitable medium, including but not limited to: a wireless medium, a wired medium, or the like, or any suitable combination thereof.

The flowcharts and block diagrams in the accompanying drawings illustrate possible system architectures, functions, and operations that may be implemented by a system, a method, and a computer program product according to various embodiments of the present disclosure. Each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed in parallel, and sometimes the two boxes may be performed in a reverse sequence. This is determined by a related function. Each block in the block diagram or the flowchart, and a combination of blocks in the block diagram or the flowchart may be implemented by using a dedicated hardware-based system that performs a specified function or operation, or may be implemented by using a combination of dedicated hardware and computer-readable instructions.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

A related unit described in the embodiments of the present disclosure may be implemented in a software manner, or may be implemented in a hardware manner, and the unit described may also be set in a processor. Names of the units do not constitute a limitation on the units.

According to another aspect, the present disclosure further provides one or more computer-readable media. The computer-readable media may be included in the electronic device described in the embodiments, or may exist alone and is not assembled in the electronic device. The computer-readable medium carries one or more computer-readable instructions, the one or more computer-readable instructions, when executed by the electronic device, causing the electronic device to implement the method described in the embodiments.

Although a plurality of modules or units of a device configured to perform actions are discussed in the detailed description, such division is not mandatory. Actually, according to the implementations of the present disclosure, the features and functions of two or more modules or units described above may be implemented in one module or unit. Conversely, features and functions of one module or unit described above may be further divided into a plurality of modules or units for implementation.

Through the descriptions of the implementations, a person skilled in the art easily understands that the exemplary implementations described herein may be implemented through software, or may be implemented through software located in combination with suitable hardware. Therefore, the technical solutions of the embodiments of the present disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of the present disclosure.

What is claimed is:

1. A data transmission method, applied to a next generation nodeB, the method comprising:
    acquiring a time delay parameter corresponding to an advanced interactive data packet, and acquiring time delay monitoring information between the next generation nodeB and a user equipment;
    acquiring a transmission delay of the advanced interactive data packet on a network side in response to identifying that a data packet transmitted by a user plane function belongs to data sub-packets obtained by splitting the advanced interactive data packet;
    predicting, according to the time delay parameter, the time delay monitoring information, and the transmission delay of the advanced interactive data packet on the network side, whether transmitting the data sub-packets to the user equipment meets a time delay desirable; and
    stopping, in response to determining that transmitting the data sub-packets to the user equipment does not meet the time delay desirable, transmitting the data sub-packets obtained by splitting the advanced interactive data packet to the user equipment.

2. The data transmission method according to claim 1, wherein the time delay parameter is acquired by one or more of:
    receiving a configuration signaling of the network side, and acquiring the time delay parameter from the configuration signaling;
    determining the time delay parameter according to a Quality of Service (QoS) flow identifier transmitted by the network side; and
    acquiring the time delay parameter from a QoS parameter corresponding to the advanced interactive data packet.

3. The data transmission method according to claim 1, wherein acquiring the transmission delay comprises:
    performing interaction with the user plane function to acquire the transmission delay of the advanced interactive data packet on the network side, the transmission delay including a dynamic delay or a static delay.

4. The data transmission method according to claim 3, wherein the transmission delay of the advanced interactive data packet on the network side is the dynamic delay, and the interaction is performed by one or more of:
    determining the transmission delay of the advanced interactive data packet on the network side according to time stamp information carried in each of the data sub-packets transmitted by the user plane function and obtained by splitting the advanced interactive data packet; and
    determining the transmission delay of the advanced interactive data packet on the network side according to overall time stamp information transmitted by the user plane function for the advanced interactive data packet.

5. The data transmission method according to claim 1, wherein acquiring the time delay monitoring information comprises:
    monitoring time delay information of a plurality of communication links between the next generation nodeB and the user equipment; and
    calculating an average value of the monitored time delay information of the plurality of communication links, and taking the average value as the time delay monitoring information.

6. The data transmission method according to claim 5, wherein the time delay information is monitored by one or more of:
    respectively monitoring time delay information between the next generation nodeB and the user equipment on a plurality of Data Radio Bearers (DRBs);
    respectively monitoring time delay information between the next generation nodeB and the user equipment on a plurality of logic channels; and
    respectively monitoring time delay information between the next generation nodeB and the user equipment on a plurality of logic channel groups.

7. The data transmission method according to claim 1, further comprising:
    abandoning, in response to determining that transmitting the data sub-packets to the user equipment does not meet the time delay desirable, the received data sub-packet obtained by splitting the advanced interactive data packet.

8. The data transmission method according to claim 1, further comprising:
    transmitting feedback information to the user plane function in response to determining that transmitting the data sub-packets to the user equipment does not meet the time delay desirable, the feedback information being used for indicating the user plane function that the transmission of the advanced interactive data packet does not meet the time delay desirable.

9. The data transmission method according to claim 8, wherein transmitting the feedback information comprises:
    transmitting the feedback information to the user plane function in response to a determination that all the data sub-packets obtained by splitting the advanced interactive data packets are not completely received.

10. The data transmission method according to claim 1, wherein the plurality of data sub-packets obtained by splitting the advanced interactive data packet includes a start data packet and an end data packet;
    the start data packet contains first indication information, the first indication information being used for indicating that the start data packet is a first transmitted data sub-packet of the plurality of data sub-packets; and
    the end data packet contains second indication information, the second indication information being used for indicating that the end data packet is a last transmitted data sub-packet of the plurality of data sub-packets.

11. The data transmission method according to claim 1, further comprising one or more of:
    identifying, according to indication information contained in a protocol field of a received data packet, whether the received data packet belongs to the data sub-packets obtained by splitting the advanced interactive data packet; and
    identifying, according to indication information contained in payload information of a received data packet, whether the received data packet belongs to the data sub-packets obtained by splitting the advanced interactive data packet.

12. The data transmission method according to claim 1, further comprising:

stopping, in response to detecting that there is a data sub-packet, failed to be transmitted to the user equipment, among the data sub-packets obtained by splitting the advanced interactive data packet, transmitting the remaining data sub-packets obtained by splitting the advanced interactive data packet to the user equipment.

13. A data transmission apparatus, applied to a next generation nodeB, the apparatus comprising: a memory storing computer program instructions; and a processor coupled to the memory and configured to execute the computer program instructions and perform:

acquiring a time delay parameter corresponding to an advanced interactive data packet, and acquiring time delay monitoring information between the next generation nodeB and a user equipment;

acquiring a transmission delay of the advanced interactive data packet on a network side in response to identifying that a data packet transmitted by a user plane function belongs to data sub-packets obtained by splitting the advanced interactive data packet;

predicting, according to the time delay parameter, the time delay monitoring information, and the transmission delay of the advanced interactive data packet on the network side, whether transmitting the data sub-packets to the user equipment meets a time delay desirable; and stopping, in response to determining that transmitting the data sub-packets to the user equipment does not meet the time delay desirable, transmitting the data sub-packets obtained by splitting the advanced interactive data packet to the user equipment.

14. The data transmission apparatus according to claim 13, wherein the time delay parameter is acquired by one or more of:

receiving a configuration signaling of the network side, and acquiring the time delay parameter from the configuration signaling;

determining the time delay parameter according to a Quality of Service (QoS) flow identifier transmitted by the network side; and acquiring the time delay parameter from a QoS parameter corresponding to the advanced interactive data packet.

15. The data transmission apparatus according to claim 13, wherein acquiring the transmission delay includes:

performing interaction with the user plane function to acquire the transmission delay of the advanced interactive data packet on the network side, the transmission delay including a dynamic delay or a static delay.

16. The data transmission apparatus according to claim 15, wherein the transmission delay of the advanced interactive data packet on the network side is the dynamic delay, and the interaction is performed by one or more of:

determining the transmission delay of the advanced interactive data packet on the network side according to time stamp information carried in each of the data sub-packets transmitted by the user plane function and obtained by splitting the advanced interactive data packet; and determining the transmission delay of the advanced interactive data packet on the network side according to overall time stamp information transmitted by the user plane function for the advanced interactive data packet.

17. The data transmission apparatus according to claim 13, wherein acquiring the time delay monitoring information includes:

monitoring time delay information of a plurality of communication links between the next generation nodeB and the user equipment; and calculating an average value of the monitored time delay information of the plurality of communication links, and taking the average value as the time delay monitoring information.

18. The data transmission apparatus according to claim 17, wherein the time delay information is monitored by one or more of:

respectively monitoring time delay information between the next generation nodeB and the user equipment on a plurality of Data Radio Bearers (DRBs);

respectively monitoring time delay information between the next generation nodeB and the user equipment on a plurality of logic channels; and respectively monitoring time delay information between the next generation nodeB and the user equipment on a plurality of logic channel groups.

19. The data transmission apparatus according to claim 13, wherein the processor is further configured to execute the computer program instructions and perform:

abandoning, in response to determining that transmitting the data sub-packets to the user equipment does not meet the time delay desirable, the received data sub-packet obtained by splitting the advanced interactive data packet.

20. A non-transitory computer-readable storage medium storing computer program instructions executable by at least one processor to perform:

acquiring a time delay parameter corresponding to an advanced interactive data packet, and acquiring time delay monitoring information between the next generation nodeB and a user equipment;

acquiring a transmission delay of the advanced interactive data packet on a network side in response to identifying that a data packet transmitted by a user plane function belongs to data sub-packets obtained by splitting the advanced interactive data packet;

predicting, according to the time delay parameter, the time delay monitoring information, and the transmission delay of the advanced interactive data packet on the network side, whether transmitting the data sub-packets to the user equipment meets a time delay desirable; and stopping, in response to determining that transmitting the data sub-packets to the user equipment does not meet the time delay desirable, transmitting the data sub-packets obtained by splitting the advanced interactive data packet to the user equipment.

* * * * *